June 2, 1925.
W. N. BOOTH
1,539,932
MANUFACTURE OF VEHICLE WHEEL SPOKE BLANKS
Filed March 24, 1924
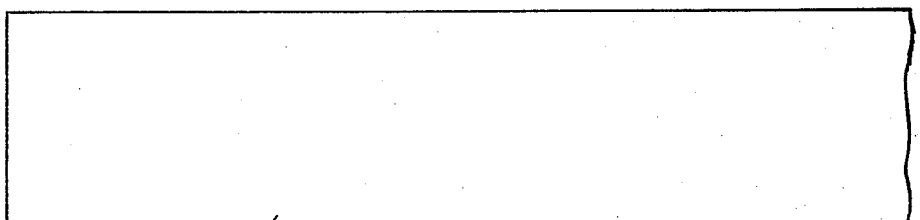
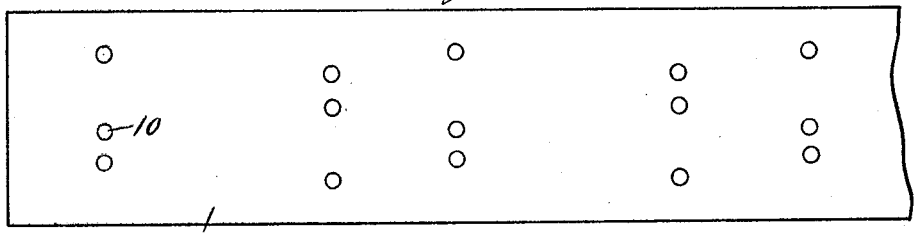
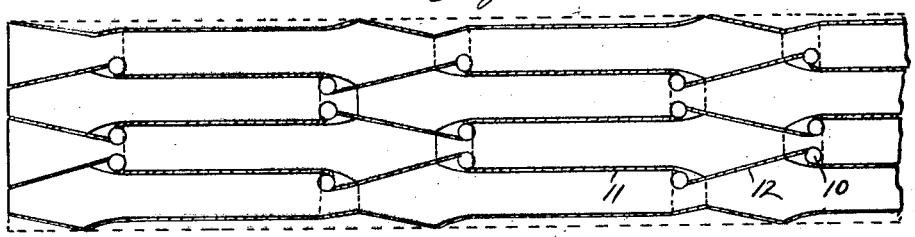
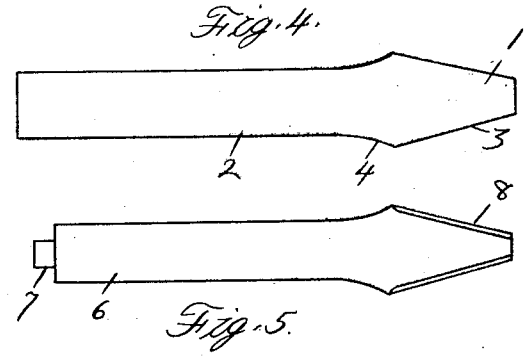
Inventor
William N. Booth.
By Whittemore Hulbert Whittemore Belknap.
Attorneys Patented June 2, 1925.

1,539,932

UNITED STATES PATENT OFFICE.

WILLIAM N. BOOTH, OF DETROIT, MICHIGAN.

MANUFACTURE OF VEHICLE WHEEL-SPOKE BLANKS.

Application filed March 24, 1924. Serial No. 701,512.

*To all whom it may concern:*

Be it known that I, WILLIAM N. BOOTH, a citizen of the United States of America, residing at Detroit, in the county of Wayne and State of Michigan, have invented certain new and useful Improvements in the Manufacture of Vehicle Wheel-Spoke Blanks, of which the following is a specification, reference being had therein to the accompanying drawings.

The invention relates to the manufacture of vehicle wheel spoke blanks and refers particularly to the manufacture from a blank of a plurality of spoke blanks each having a spindle portion and a bevelled end portion. The principal object of the invention is the manufacture of the spoke blanks with the minimum loss of material and with the minimum cost. With this object as well as others in view, the invention resides in the novel features as more fully hereinafter set forth.

In the drawings:

Figure 1 is a plan view of the blank from which the vehicle wheel spoke blanks are formed;

Figure 2 is a plan view thereof after the first operation;

Figure 3 is a plan view thereof after the next operation;

Figure 4 is a plan view of a spoke blank;

Figure 5 is a plan view of a finished spoke.

As shown particularly in Figures 3 and 4, the vehicle wheel spoke blank 1 has the spindle portion 2 and the bevelled end portion 3 with the shoulders 4 formed therebetween. The spoke shown in Figure 5 is formed from the spoke blank 1 by suitable machining operations to form from the spindle portion of the latter, the spindle portion 6 and the tenon 7 at the end thereof and also to form from the bevelled end portion of the blank the bevelled end portion 8.

9 is the blank from which the spoke blanks are formed, this blank being in the present instance a wooden plank. The first step in forming the spoke blanks is the boring of the staggered apertures 10 in the blank, these apertures being formed in rows extending longitudinally of the plank and being staggered transversely thereof, the apertures intermediate those at the side edges of the plank being arranged in transversely-extending pairs, the combined diameters of which are substantially equal to the width of the individual spindle portions of the spoke blanks.

The next operation consists in cutting by suitable means, such as a band-saw, the blank 9 with the saw cutting in a general longitudinal direction along the path indicated by the longitudinally-extending aligned portions 11 and along the connecting portions 12 which are inclined relative to the aligned portions and have their ends offset relative to the aligned portions into which they respectively connect. The reason for providing the apertures 10 is to afford sufficient clearance for the turning of the saw in the plank.

With this method of cutting the plank it will be seen that the spoke blanks formed therefrom are in rows extending longitudinally of the plank and have overlapping bevelled ends, adjacent sides of which are formed by the same saw cut and are consequently parallel, these bevelled end portions of alternate rows facing in opposite directions. It will also be seen that the spindle portions of adjacent spoke blanks overlap and that their adjacent sides are formed by the same saw cut and are consequently parallel.

It will be seen that with this method, the minimum amount of material is wasted. Furthermore, the method is such that the spoke blanks may be cut by means of a machine which is common in wood-working factories, namely a band-saw machine, and consequently formed at low cost.

What I claim as my invention is:

1. In the manufacture of vehicle wheel spoke blanks each having a spindle portion and a bevelled end portion, the severing of a blank to form a plurality of spoke blanks having overlapping bevelled end portions with adjacent sides parallel to each other.

2. In the manufacture of vehicle wheel spoke blanks each having a spindle portion and a bevelled end portion. the severing of a blank to form a plurality of spoke blanks having overlapping bevelled end portions with adjacent sides parallel to each other and also having overlapping spindle portions with adjacent sides parallel to each other.

3. In the manufacture of vehicle wheel spoke blanks each having a spindle portion and a bevellel end portion, the forming of staggered openings in a blank from which the spoke blanks are formed, and the cutting of the portions of said blank between longitudinally spaced openings to form spoke blanks having overlapping bevelled end portions with adjacent sides parallel to each other, and also having overlapping spindle portions with adjacent sides parallel to each other.

4. In the manufacture of vehicle wheel spoke blanks each having a spindle portion and a bevelled end portion, the longitudinal severing of the blank from which the spoke blanks are formed to produce rows of aligned spoke blanks, the bevelled end portions of the spoke blanks of one row facing in the opposite direction to the bevelled end portions of the spoke blanks of the next adjacent row, and overlapping and provided with adjacent parallel sides.

In testimony whereof I affix my signature.

WILLIAM N. BOOTH.